United States Patent [19]

Morizane

[11] Patent Number: 5,531,822
[45] Date of Patent: Jul. 2, 1996

[54] MODIFIER FOR POROUS MATERIALS AND METHOD OF MODIFYING POROUS MATERIALS

[76] Inventor: Toshinori Morizane, 26-12, Hazawa 2-chome, Nerima-ku, Tokyo, Japan

[21] Appl. No.: 434,369

[22] Filed: May 3, 1995

Related U.S. Application Data

[62] Division of Ser. No. 202,219, Feb. 25, 1994, Pat. No. 5,449,533.

[30] Foreign Application Priority Data

Mar. 1, 1993 [JP] Japan ...................... 5-64698

[51] Int. Cl.$^6$ ................................. C04B 12/04
[52] U.S. Cl. .................. 106/600; 106/634; 106/637; 106/286.1; 106/287.1
[58] Field of Search .................... 106/600, 637, 106/287.1, 286.1, 634

[56] References Cited

U.S. PATENT DOCUMENTS

| | | | |
|---|---|---|---|
| 4,312,673 | 1/1982 | Neely, Jr. ................... | 106/629 |
| 4,528,149 | 7/1985 | Wichelhaus et al. ............ | 106/604 |
| 4,878,947 | 11/1989 | Helferich ..................... | 106/602 |

FOREIGN PATENT DOCUMENTS

| | | | |
|---|---|---|---|
| 1696427 | 7/1972 | Germany ............... | 106/637 |
| 63-21214 | 8/1988 | Japan . | |
| 3-8710 | 1/1991 | Japan . | |
| 3-164458 | 7/1991 | Japan . | |
| 808454 | 2/1981 | U.S.S.R. ............... | 106/637 |
| 833761 | 5/1981 | U.S.S.R. ............... | 106/637 |
| 996373 | 2/1983 | U.S.S.R. ............... | 106/637 |

*Primary Examiner*—Anthony Green
*Attorney, Agent, or Firm*—Armstrong, Westerman, Hattori, McLeland & Naughton

[57] ABSTRACT

The invention provides modified stonework material as well as modified woven fabric, paper, and ligneous materials with improved water-proof, dust-prevention, wear-resistance, and others. These porous materials are rendered non-porous by causing aqueous solution of alkali silicate to penetrate into such porous materials to produce calcium silicate and colloidal silicic acid in the presence of ammonium ions and halogen ions, the solution of which fills the voids in the material perfectly to render it non-porous.

4 Claims, No Drawings

MODIFIER FOR POROUS MATERIALS AND METHOD OF MODIFYING POROUS MATERIALS

This is a division of application Ser. No. 08/202,219 filed Feb. 25, 1994, now U.S. Pat. No. 5,449,533.

BACKGROUND OF THE INVENTION a) Field of the Invention

The present invention relates to a modifying agent (or modifier) for improving various properties of porous stonework materials such as concrete products like concrete panels, light-weight fire-resistant building materials, etc., other cement products, calcium silicate boards, gypsum products, and so forth; and those porous materials such as woven fabrics, paper, ligneous materials, and others, by rendering them non-porous. With such modifier being used, the above-mentioned porous stonework materials improve their water-resistant property, dust-preventing property, wear-resistant property, mechanical strength, and other properties, while those porous materials like woven fabrics, paper, ligneous materials, etc. are imparted various characteristics such as fire-resistant property, prevention of contraction due to drying, and others.

The present invention is also concerned with a method of modifying porous materials by use of such modifier, and the above-mentioned porous materials as modified by such method.

b) Description of the Background

The tactile surface of a stonework material is primarily porous, and represents, when viewed in an enlarged scale, surface conditions similar to sponge, which has a water-absorbing property. On account of this, water content penetrates unceasingly into the body of the material through small pores within it, along with which other foreign substances such as dust, fine particles, oily substances acids, etc. also pass through. This brings about corrosion of the stonework material. Moreover, the penetrated water goes through cycles of freezing/defrosting due to differences in atmospheric temperature. As a consequence of which, the stonework material tends to readily bring about peeling and falling, swelling, groove-forming, breaking, etc., under the stress induced by expansion and contraction.

In particular, concrete or the like materials readily generate dust particles due to its being worn-down at the place where it is used. Further, the road bed, the pedestrian zone, a car park, etc. are required to improve their wear-resistance, water-proof (water-tightness), dust-preventive property, mechanical property, etc.. If oily contaminants such as oil, grease, etc. stick onto the surface of the stonework material, these contaminants penetrate into the material through small pores within it, and become unable to be removed by wiping with use of a wet mop, etc..

The stonework material, for example marble to name one, has so far been used as an outer covering. Even in that case, however, there takes place corrosion due to its water-absorbing property as mentioned above, or moss grows due to absorption of organic substances, whereby the outer appearance of the stonework structures become spoiled in most occasions.

In order to avoid such undesirable phenomenon, there has so far been attempted various preventive methods such as one in which the surface of the stonework material is covered with a resin; or another, in which the small pores in the stonework material are filled with an inorganic type materials or an organic type material; as well as others.

Furthermore, as the fire-retarding treatment for paper, fibers, ligneous material, etc., there has so far been practiced an impregnation treatment with use of a chemical prepared from combination of boric acid and borax or Glauber's salt, etc..

However, the abovementioned method of covering the surface of the stonework material not only spoils the sense of touch on the original surface of the material, but also brings about impairment in the outer appearance due to deterioration of the material surface by the swelling of the coated resin with water content therein, absorption of oxygen and ultra-violet rays with the consequence that the stonework material becomes inappropriate as an outer covering material.

There have been made publicly known a large number of inorganic type and organic type pore-filling agents. Examples of the inorganic type pore-filling agent are: water-soluble silicate compounds such as sodium silicate, etc., a solution of which is applied to, and impregnated in, the surface of the stonework material for its reinforcement; a synthetic resin emulsion prepared by mixing very fine powder of non-crystal siliceous material such as sheet glass or glass chips, etc., and a cementitious material, which emulsion is injected into the stonework material to penetrate therewithin (as disclosed, in laid-open Japanese patent application No. 3 164458); and others. On the other hand, examples of the organic type pore-filling agent are polyurethane resin, epoxy resin, and other organic polymeric materials, which are filled in the voids of the stonework material in various ways.

The conventional methods of charging the pore-filling agent are all to impregnate it from the surface of the stonework material, which method is, however, unable to avoid the pressure of small air bubbles confined in the small pores of the stonework material, hence it is difficult to render the material perfectly non-porous. On account of this, it is not possible to prevent the pore-filling agent from its elution and deterioration over a long period of time due to insufficient water-resistant property after its curing.

On the other hand, those porous materials such as paper, fibers, ligneous materials, etc. which have been modified by the conventional method of subjecting them to immersion into a chemical prepared by combining boric acid and borax of Glauber's salt, etc. are unable to avoid toxicity of the chemical to be eluted from the material, and shrinkage of the ligneous material due to its drying, and others.

SUMMARY OF THE INVENTION

It is therefore a principal object of the present invention to solve these various problems inherent in the conventional techniques, and to provide a modifying agent which is capable of rendering the interior of the porous stonework material to be non-porous by chemical reaction to thereby improve its various requisite properties such as water-resistance, dust-prevention, wear-resistance, chemicals-resistance, mechanical strength, and so forth; to prevent the material from cracking due to differences in temperature; to enable marble and other stonework materials to be used as the outer covering materials, and which is also capable of attaining the fire-resistant property of those organic type porous materials such as paper, fibers, ligneous materials, and the like.

The another object of the present invention is to provide a method for modifying the stonework materials with use of such modifier.

It is still another object of the present invention to provide modified stonework materials as well as modified organic materials by means of the abovementioned modifying method.

According to one aspect of the present invention, there is provided a modifying agent for porous materials, which consists essentially of alkali silicate, as the principal constituent, added with 0.01 to 1.0 mol/kg of ammonium ions and 0.01 to 1.0 mol/kg of halogen ions.

According to another aspect of the present invention, there is provided a method for modifying a stonework material, which comprises the steps of: causing an aqueous solution of alkali silicate to penetrate into said stonework material; subjecting calcium, magnesium, and aluminum in said stonework material to ion-substitution reaction with alkali metal in said alkali silicate, with halogen ions as a catalyst in the presence of ammonium ions; and filling by deposition the pores of said stonework material with the thus produced silicate with calcium silicate as the principal constituent and colloidal silicic acid to thereby render said material to be non-porous.

According to the present invention, in still another aspect, there is provided a stonework material as modified by the abovementioned method.

Throughout the description of the present invention, the term "stonework material" or simply "stone material" is meant by cement, concrete, natural rocks and stones as worked by human hands such as, for example, various shaped articles of cement, light-weight fire-resistant building materials, and like other concrete products; shaped articles of marble, tiles, gypsum, etc.; calcium silicate plate, and others.

According to the present invention, in still other aspect, there is provided a method for modifying porous materials such as woven cloth, paper, or ligneous material, which comprises the steps of: impregnating said materials with an aqueous solution containing therein at least one substance selected from the group consisting of calcium, magnesium, aluminum, and two or more of ions of said substances, followed by drying said impregnated material; thereafter causing aqueous solution of alkali silicate to penetrate into said material; subjecting calcium, magnesium, and aluminum in said stonework material to ion-substitution reaction with alkali metal in said alkali silicate, with halogen ions as a catalyst in the presence of ammonium ions; and filling by deposition the pores of said porous material with the thus produced silicate with calcium silicate as the principal constituent and colloidal silicic acid to thereby render said material to be non-porous.

According to a further aspect of the present invention, there is provided woven cloth, paper, or ligneous material as modified by the abovementioned method.

The foregoing objects, other objects as well as the details of the compounds constituting the modifier, and the process steps for the practice of the method according to the present invention will become clearer and more understandable from the following description of the invention, in reference to a couple of preferred examples.

DETAILED DESCRIPTION OF INVENTION

Alkali silicate to be used for the purpose of the present invention is represented by a general formula of $M_2O.nSiO_2$ (where: M is any of Na, K, Li, Cs; and n is an integer of 1 to 5, but may not necessarily be an integer). Alkali silicate is used in the form of an aqueous solution, the concentration of which should suitable be in a range of from 10 to 50% by weight in terms of $M_2O.nSiO_2$. With the concentration not reaching 10% by weight, calcium silicate, etc. to be produced from the reaction is insufficiently deposited. On the contrary, when the concentration exceeds 50% by weight, the aqueous solution increases in viscosity so as to become difficult to penetrate into the interior of the pores of the material. In either case, the purpose of the present invention is attained unfavorably. In order to accelerate penetration and dispersion of this aqueous solution of alkali silicate into the stonework material, it is preferable to add alcohol to this solution.

Since the aqueous solution of a alkali silicate is also alkaline, the stonework material should preferably be masked by adding alcohol solution of triethanol amine (a concentration of from 1:2 to 1:1 being usually used) for prevention of calcium hydroxide, etc. from being deposited, in the case of adding halogen ions such as fluorine, etc.. Although there is no particular limitation to the adding quantity of the alcohol solution of triethanol amine, it may usually be used in about 0.1 to 10% by weight with respect to the total quantity of aqueous solution of a alkali silicate.

For the purpose of the present invention, the presence of both ammonium ion as an activator and halogen ion as a catalyst is indispensable for the ion-substitution reaction between calcium, magnesium, and aluminum in the stonework material and the alkali metal in the alkali silicate. The source of ammonium ion should preferably selected from among inorganic salts such as, for example, ammonium chloride, ammonium fluoride, etc., the added quantity of which may preferably be in a range of from 0.01 to 1.0 mol/kg with respect to the total quantity of the aqueous solution of alkali silicate. As the halogen ion catalyst, chlorine ion or fluorine ion is preferable, the ion source of which is preferably chloride or fluoride of metals such as Na, K, Ca, Mg, Al, and so forth. Its quantity of use may preferably be in a range of from 0.01 to 1.0 mol/kg with respect to the total quantity of the aqueous solution of alkali silicate. With the quantity of use of the halogen ion not reaching 0.01 mol/kg, its effect as the catalyst is not sufficient, hence the purpose of the present invention cannot be achieved perfectly. No particular disturbance would take place even if the quantity of use exceeds 1.0 mol/kg, though the chemicals are wasted.

The modifier according to the present invention is the aqueous solution of alkali silicate containing therein ammonium ion (as the activator) and halogen ion (as the catalyst) in the respective ranges as mentioned above. These ammonium ion and halogen ion may be added either in advance or immediately before use of the aqueous solution. Alcohol which is effective for penetration and dispersion of the modifier can be added to the aqueous solution of alkali silicate in the same manner. Alcohol to be used for the purpose may suitably be selected from methanol, ethanol, n-propyl alcohol, isopropyl alcohol, and so forth. The added quantity of alcohol should preferably be in a range of from 1 to 5% by weight with respect to the total weight of the aqueous solution of alkali silicate.

Any arbitrary method can be adopted for bringing the stonework material into contact with the aqueous solution of alkali silicate. For instance, it may be that predetermined quantities of ammonium compound and halogen compound are added beforehand to the aqueous solution of alkali silicate with its concentration having been adjusted to a predetermined level, into which aqueous solution the stonework material is immersed; or that the aqueous solution prepared as mentioned above is sprayed onto the surface of the stonework material. In the case of spraying, the stonework material is required to be in a sufficiently wetted condition by advance absorption of water before the spraying, and yet the spraying must be repeated in such a manner that the stonework material may be wetted in a saturated condition for 30 min. or longer.

By the way, it is desirable for the practice of the present invention to remove beforehand any foreign substances adhered onto the surface of the stonework material for keeping it in a clean state, before it is brought into contact with the aqueous solution of alkali silicate, in order for the aqueous solution of alkali silicate to penetrate into the interior of the stonework material.

Furthermore, calcium silicate and colloidal silicic acid as produced from the reaction between the stonework material and the aqueous solution of alkali silicate, after it has sufficiently penerated into the material, should preferably be removed by rinsing with water so as to isolate various foreign substances such as oil and other organic substances, acids, alkalis, isolated lime, contamination caused by passage of automobiles and human beings, etc. to the material surface by the phase-separation phenomenon, etc..

Since the reactive agent (alkali silicate) according to the present invention reacts with moisture and chemical component such as calcium oxide in the main as contained in the porous stonework material, to principally produce calcium silicate and colloidal silicic acid, both of which contribute to increase the density of materials having permeability, thereby filling the small pores, in which air is confined, thus preventing intrusion of moisture from outside. Therefore, at the time of the reaction, those small voids, from which air and water vapor are removed, still remain within the materials; hence the stonework material is required to be desiccated sufficiently.

In the case of modifying those porous materials such as paper, fibers, ligneous materials, and so forth, it becomes necessary to impregnate, first of all, these materials with calcium, magnesium, etc. in the form of their aqueous solution, because such porous materials do not primarily contain these metal substances. There is no particular limitation to the compounds containing the abovementioned metal substances, and any of those compounds which are soluble in water may be used. Examples of such compounds are nitrate, chloride, and fluoride of these metal substances. Any arbitrary method of impregnation may be adopted, but the metal substance must be penetrate sufficiently into the interior of the material to be modified; otherwise the filling by deposition of calcium silicate, etc. to be produced by the subsequent treatment with alkali silicate cannot done well within the interior of the material to be modified, as the consequence of which are the purpose of the present invention cannot be attained.

After drying the material which has completed the abovementioned treatment, an aqueous solution of alkali silicate is caused to penetrate, which can be done in pursuance of the treatment method for modifying the stonework material as already described in the foregoing.

In the modification of paper or the like materials, if an extender such as talc, etc. is contained in such materials, no impregnation treatment of the aqueous solution of calcium, etc. as mentioned above, is necessary, but penetration treatment of the aqueous solution of alkali silicate can only be done.

The stonework material and those porous materials such as paper, fiber, ligneous material, etc., which have been modified in accordance with the above-described method of the present invention, are of such structure that the small pores inherent in these materials are filled with calcium silicate which was produced by the reaction between calcium, etc. existing in the material to be modified and alkali silicate, and colloidal silicic acid, whereby the voids occupied by air which has been confined in the porous material are packed. As the result of this, ingression of moisture content is prevented to tightly seal the interior of the material, thus perfectly intercepting the moisture from outside, and preventing penetration of oil, salt, acid, alkali, etc. from outside, so that the deterioration of the material with passage of time is suppressed, and growth of moss is also restrained.

Also, deposition of calcium silicate, etc. in the interior of the pores helps to remove those oily substances, acids, alkalis, isolated lime, contaminating substances generated by passage of automobiles and human beings, and others, by isolating them to the material surface through the phase-separation phenomenon, etc..

The ligneous material such as paper, etc., which has been modified in accordance with the present invention, does not contain the sulfuric acid radical, unlike those conventional modified materials using sulfate. On account of this, there takes place no corrosion of a metal jigs to be used for fire-resisting treatment of building materials, which is particularly effective for fire-resisting treatment of particle board manufactured by use of wooden chips. In order to render the particle board to be fire-resistant, the wooden chips as modified by the method of the present invention are, first of all, mixed and kneaded with a conventionally used binder, and the thus kneaded wooden chips are subjected to a roll-curing treatment. In the case of lumber as treated in this manner, nails are also prevented from getting rusted.

The reaction to be employed for the purpose of the present invention can be explained by a tendency of a metal to become cationic when it comes into contact with water or solution, i.e., by the normal electrode potential of a metal. That is to say, it is an application of a phenomenon such that, when, for example, a metal $M^1$ (Na, K, etc.) comes into contact with an electrolytic solution containing a different kind of metal ion $M^2$ (Ca, Mg, Al, etc.), the following ion-substitution reaction proceeds rightward according as the ionization tendency of $M^1$ being greater than that of $M^2$:

$$M^1 \text{ (undissociated)} + M^2 \text{ (ion)} \rightarrow M^1 \text{ (ion)} + M^2 \text{ (undissociated)} \quad (1)$$

In general, the aqueous solution of alkali silicate exhibits strong alkalinity by its hydrolyzation in accordance with the following Equation (2):

$$M^1_2SiO_3 + H_2O \rightarrow M^1_2Si_2O_5 + M^1OH \quad (2)$$

[aqueous solution of alkali silicate]
 (where: $M^1_2SiO_3 = M^1_2O \cdot SiO_2$; $M^1_2Si_2O_5 = M^1_2O \cdot 2SiO_2$ (hereinafter represented as such).

$M^2O$, etc. in the material reacts with alkali silicate to produce a silicate of $M^2$ and colloidal silicic acid as shown, for example, in Equation (3) below:

$$M^1_2Si_2O_5 + M^2O + H_2O \rightarrow M^2SiO_3 + SiO_2 + Si(OH)_4 + M^1OH \quad (3)$$

(silicate)(colloidal silicic acid)

While the catalytic action of halogen ion $X^-$ in the present invention has yet to be clarified, it can be assumed as follows. That is to say, $X^-$ acts on $M^2$ to produce a complex ion $M^2X^-_{n+1}$ (where: m is an oxidation number of the metal $M^2$), which is supposed to accelerate hydrolyzation and dehydration reactions as shown in the following equations (4) and (5), respectively:

$$M^2X^-_{n+1} + H_2O \rightarrow M^2(OH)_s + X^- \quad (4)$$

$$M^2(OH)_s + M^1{}_2Si_2O_5 \rightarrow M^2Si_2O_5 + M^1OH \quad (5)$$

Further, the ammonium ion in the present invention functions to activate the Si ion when colloidal silicic acid is produced from free Si ion in the course of the reaction step as indicated by the Equation (3).

With a view to enabling those persons skilled in the art to practice the present invention, the following preferred examples are presented for the modifier of porous materials, the method for modifying the porous materials using such modifier, and the thus modified porous materials.

EXAMPLE 1

A modifier was prepared in the following manner, using the following selected ingredients. 3% by weight of methanol was mixed with an aqueous solution containing therein 20% by weight of sodium silicate of a composition of $Na_2O \cdot 3SiO_2$ with respect to its total weight and then 0.1 mol/kg of $NH_4Cl$ (corresponding to 0.1 mol/kg of each of ammonium ion and chlorine ion) was added to the total weight of the thus obtained mixture solution of water and alcohol, thereby preparing the modifier.

Using a wire brush, the surfaces of marble and concrete panels for outer covering, as the material to be modified, were wiped to remove contaminants adhered onto them, thereby carrying out a pre-treatment.

Onto the cleaned surfaces of the abovementioned materials, water or warm water was sprayed to maintain the same in a condition of sufficient water-bearing, after which the previously prepared modifying agent was sprayed.

The modifier was repeatedly replenished and sprayed onto the surfaces of the materials to be modified in a manner to maintain the wet condition for 30 min. in the state of these materials being saturated with the modifier.

Thereafter, when the surfaces of the materials began to dry, water was sprayed to wash away the modifier. After completion of the washing, the surfaces of the materials were wiped off and they were dried for three hours.

The thus modified marble and concrete panels, when used as the outer covering material, exhibited the effect of the present invention in respect of their durability, water resistance, and other properties. As to their percentage of water-absorption and chemical-resistance, test pieces of the thus modified materials were immersed in water and chemicals such as acid, alkali, etc. for a certain definite period of time, after which their weight changes were measured.

EXAMPLE 2

A modifier was prepared in the following manner, using the following selected ingredients. 3% by weight of methanol was mixed with an aqueous solution of sodium silicate of the same composition and the same concentration as in Example 1 above, with respect to its total weight. To this mixed solution, there was added 1% by weight of triethanol amine and methanol solution (at a rate of 1:1), and then 0.1 mol/kg of hydrogen salt of ammonium fluoride $NH_4HF_2$ (corresponding to 0.1 mol/kg of each of ammonium ion and fluorine ion) was added to the thus obtained solution, whereby the modifier was prepared.

Surfaces of a wooden panel and particle board were cleaned, and then immersed in a 10% aqueous solution of calcium chloride to cause the aqueous solution to penetrate sufficiently into the interior of the material to be modified, followed by drying the same.

The abovementioned pre-treated particle board was impregnated with the abovementioned modifier in the same manner as in Example 1 above, after which it was subjected to treatments of washing with water, wiping, and drying. The impregnation of the wooden panel with the modifier was done under pressure, the treatment thereafter having been the same as in the case of the particle board.

The thus modified wooden panel and particle board have the structure of the modified material according to the present invention, from which the excellent effects of non-toxicity, fire-resistance, durability, and so forth were obtained, as expected.

As has so far been explained in the foregoing, the modifier for the porous materials, the method for modifying the porous materials using such modifier, and the porous materials thus modified, according to the present invention, provide various effects to be enumerated hereinbelow.

As to stonework material

1. Weather-resistant property increases to prevent water from penetrating, whereby cracking to occuring due to the freezing/defrosting cycle can be prevented, and growth of moss can also be restrained.

2. The structure of the porous material becomes reinforced, which makes it durable against use over a long period of time as an outer covering material, and which prevents fine cracks from occurring. Further, when used as a roadbed, a pedestrian way, a car park, etc., the modified material exhibits its improved wear-resistant property, dust-preventing property, water-proof property, and so on.

3. Solidified calcium silicate and colloidal silicic acid pack the pores of the material as modified, on account of which its surface is perfectly sealed to improve the external appearance.

4. By the modifying reaction, those foreign substances such as alkali, etc. in the material bring about the phase-separation to be isolated to the surface of the material for removal, and the alkali content remaining within the concrete structure, etc. is sealed in.

5. Chemicals-resistance appears in the modified material, as follows:

a) resistance to various hydrocarbons and substituted hydrocarbons (e.g., halogenated hydrocarbons, aldehyde, ketones, alcohols, amines, surfactants, aliphatic acids, etc.);

b) resistance to various oils (e.g., automobile oils, machine oils, edible oils, etc.);

c) resistance to aqueous solution of salts (saline water, etc.), anti-freezing liquid, etc..

As to organic type porous materials such as paper, fibers, ligneous materials, etc.

1. Improvement is seen in the fire-resistant property, mechanical strength, durability, etc..

Although the present invention has so far been described in detail with reference to its preferred embodiments, it is not limited to these embodiments alone, but any changes and modifications may be made by those persons skilled in the art without departing from the spirit and scope of the invention as recited in the appended claims.

I claim:

1. A modifying agent for porous materials, which consists essentially of an aqueous solution of an alkali silicate in a concentration of from 10 to 50% by weight, 0.01 to 1.0 mol/kg of ammonium ions and 0.01 to 1.0 mol/kg of halogen ions.

2. A modifying agent for porous materials as set forth in claim 1, wherein said alkali silicate is represented by a general formula: $M_2O \cdot nSiO_2$ (where: M is any of Na, K, Li and Cs; and n is an integer of 1 to 5).

3. A modifying agent for porous materials, which consists essentially of an aqueous solution of an alkali silicate in a concentration of from 10 to 50% by weight, an alcohol, 0.01 to 1.0 mol/kg of ammonium ions and 0.01 to 1.0 mol/kg of halogen ions.

4. A modifying agent for porous materials as set forth in claim 3, wherein said alkali silicate is represented by a general formula: $M_2O \cdot nSiO_2$ (where: M is any of Na, K, Li and Cs; and n is an integer from 1 to 5).

* * * * *